(12) United States Patent
Bookheimer et al.

(10) Patent No.: US 11,883,894 B2
(45) Date of Patent: Jan. 30, 2024

(54) COMPOSITE CUTTING TOOL

(71) Applicant: Kennametal Inc., Latrobe, PA (US)

(72) Inventors: Alan J. Bookheimer, Latrobe, PA (US); Logan M. Semnisky, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 237 days.

(21) Appl. No.: 17/374,263

(22) Filed: Jul. 13, 2021

(65) Prior Publication Data

US 2023/0016177 A1    Jan. 19, 2023

(51) Int. Cl.
*B23D 77/00* (2006.01)
*B23D 77/02* (2006.01)

(52) U.S. Cl.
CPC ........... *B23D 77/006* (2013.01); *B23D 77/02* (2013.01); *B23D 77/025* (2013.01); *B23D 2277/72* (2013.01)

(58) Field of Classification Search
CPC .... B23D 77/006; B23D 77/02; B23D 77/025; B23D 2277/72; B23C 5/2204
See application file for complete search history.

(56) References Cited

U.S. PATENT DOCUMENTS

| | | | |
|---|---|---|---|
| 2,828,529 A | 4/1958 | Bryant | |
| 5,135,337 A | 8/1992 | Adamson | |
| 5,152,640 A | 10/1992 | Regis et al. | |
| 5,605,420 A | 2/1997 | Feldsine | |
| 5,921,727 A | 7/1999 | Depperman | |
| 5,934,842 A | 8/1999 | Gupta | |
| 6,120,218 A | 9/2000 | Bishop | |
| 6,655,883 B2 | 12/2003 | Maar | |
| 6,890,132 B1 * | 5/2005 | Baron | B23B 51/0473 408/226 |

(Continued)

FOREIGN PATENT DOCUMENTS

| | | |
|---|---|---|
| CN | 102089103 A | 6/2011 |
| CN | 205967563 U | 2/2017 |

(Continued)

OTHER PUBLICATIONS

Apr. 15, 2023 Foreign Office Action Chinese Application No. CN202010751992.7, 20 Pages.

(Continued)

*Primary Examiner* — Eric A. Gates
(74) *Attorney, Agent, or Firm* — Larry R. Meenan

(57) ABSTRACT

A cutting tool includes a tubular body made of a composite material, such as carbon reinforced fiber polymer (CFRP). A front support structure comprising a central hub and a plurality of spokes extending radially outward from the central hub is attached proximate the front end of the tubular body. A rear support structure comprising a central hub and a plurality of spokes extending radially outward from the central hub is attached proximate the rear end of the tubular body. Cartridge supports are attached directly to one of the front and rear support structures. A rear machine connection member is attached to the rear support structure for providing coolant to the front and rear support structures. The CFRP tubular body increases the stiffness to weight ratio of the cutting tool.

19 Claims, 13 Drawing Sheets

(56) References Cited

U.S. PATENT DOCUMENTS

| | | | |
|---|---|---|---|
| 6,913,428 | B2 | 7/2005 | Kress |
| 8,545,134 | B2 | 10/2013 | Frank |
| 8,764,354 | B2 | 7/2014 | Schuffenhauer et al. |
| 8,950,985 | B2 | 2/2015 | Durand-Terrasson |
| 9,004,822 | B2 | 4/2015 | Francis et al. |
| 9,056,357 | B2 | 6/2015 | Bozkurt |
| 9,216,461 | B2 | 12/2015 | Athad |
| 9,283,624 | B2 | 3/2016 | Freyermuth et al. |
| 9,573,199 | B2* | 2/2017 | Baratta ............... B27B 5/30 |
| 9,623,494 | B2 | 4/2017 | Bozkurt |
| 10,449,609 | B2* | 10/2019 | Baratta ............... B27B 5/30 |
| 10,464,138 | B2 | 11/2019 | Kozaki et al. |
| 10,799,960 | B2 | 10/2020 | Zetek et al. |
| 10,940,551 | B1 | 3/2021 | Semnisky et al. |
| 11,203,073 | B2* | 12/2021 | Parendo ............. B23B 51/0473 |
| 11,203,074 | B2* | 12/2021 | Bek ................. B23B 51/0453 |
| 11,504,784 | B2* | 11/2022 | Semnisky ............ B23D 77/02 |
| 11,534,841 | B2* | 12/2022 | Maksimovic ....... B23B 51/0473 |
| 11,571,759 | B2* | 2/2023 | Semnisky .......... B23D 77/006 |
| 2005/0019110 | A1 | 1/2005 | Astrakhan |
| 2011/0182676 | A1 | 7/2011 | Frank et al. |
| 2011/0188954 | A1 | 8/2011 | Frank |
| 2012/0251254 | A1 | 10/2012 | Durand-Terrasson |
| 2013/0136551 | A1 | 5/2013 | Nisikawa |
| 2013/0156520 | A1 | 6/2013 | Hacker |
| 2014/0161543 | A1 | 6/2014 | Francis |
| 2014/0227047 | A1 | 8/2014 | Oettle et al. |
| 2017/0151614 | A1 | 6/2017 | Woodruff et al. |
| 2017/0252839 | A1 | 9/2017 | Donisi et al. |
| 2019/0099816 | A1 | 4/2019 | Zetek et al. |
| 2019/0314903 | A1 | 10/2019 | Haenle et al. |
| 2019/0314904 | A1 | 10/2019 | Haenle |
| 2020/0055129 | A1 | 2/2020 | Leuze et al. |
| 2021/0060665 | A1 | 3/2021 | Semnisky et al. |
| 2022/0023960 | A1 | 1/2022 | Ljatifi et al. |
| 2022/0176473 | A1 | 6/2022 | Semnisky et al. |
| 2022/0176480 | A1 | 6/2022 | Semnisky et al. |

FOREIGN PATENT DOCUMENTS

| | | |
|---|---|---|
| CN | 109070245 A | 12/2018 |
| CN | 209139934 U | 7/2019 |
| DE | 19934125 | 1/2001 |
| DE | 10305991 A1 | 12/2004 |
| DE | 10359854 A1 | 7/2005 |
| DE | 102007007399 A1 | 8/2008 |
| DE | 102009022051 B3 | 9/2010 |
| DE | 102011016921 A1 | 10/2012 |
| DE | 102017118604 A1 | 2/2018 |
| DE | 102020111782 A1 | 5/2021 |
| EP | 0074542 A2 | 3/1983 |
| EP | 0074542 A3 | 6/1984 |
| EP | 1984135 A1 | 10/2008 |
| EP | 1984135 | 3/2010 |
| EP | 2301702 A1 | 3/2011 |
| EP | 2974817 A1 | 1/2016 |
| EP | 3 772 384 A1 | 2/2021 |
| EP | 3785835 A1 | 3/2021 |
| EP | 3819055 A1 | 5/2021 |
| FR | 2927555 A3 | 8/2009 |
| FR | 2967366 A1 | 5/2012 |
| JP | 2006015444 A | 1/2006 |
| JP | 4654622 B2 | 3/2011 |
| JP | 2017030075 A | 2/2017 |
| JP | 2018149655 A | 9/2018 |
| JP | 2018149656 A | 9/2018 |
| WO | WO1987004969 A1 | 8/1987 |
| WO | WO2010020234 A1 | 2/2010 |
| WO | WO2010097082 A1 | 9/2010 |
| WO | WO2012101319 A1 | 8/2012 |
| WO | 2017083192 A1 | 5/2017 |
| WO | WO2019002050 A1 | 1/2019 |
| WO | 2020/118460 A1 | 12/2019 |
| WO | 2021/023489 A1 | 7/2020 |
| WO | WO2021023489 A1 | 2/2021 |
| WO | 2022105953 A2 | 5/2022 |

OTHER PUBLICATIONS

International Search Report and Written Opinion for International Application No. PCT/US2023/011419, dated May 22, 2023, 8 Pages.
Mar. 30, 2022 International Search Report Transmitted WO App. No. PCT/US2021/062322.
Jan. 29, 2021 Search report EP App. No. 20190517.1.
Nov. 5, 2020 Notice of Allowance U.S. Appl. No. 16/557,533.
Sep. 29, 2022 Notice of Allowance US App. No. 20220176480.
Aug. 24, 2022 Advisory Action (PTOL-303) 1 US App. No. 20220176480.
Jul. 27, 2022 Final Office Action (US Only) US App. No. 20220176480.
Jul. 21, 2022 Notice of Allowance US App. No. 20220176473.
Apr. 12, 2022 International Search Report WO No. PCT/US2021/062367.
Jun. 6, 2022 Office action (3 months) (US Only) U.S. Appl. No. 17/115,997.
Apr. 13, 2022 Office action (3 months) (US Only) U.S. Appl. No. 17/116,782.
Extended European Search Report for European Application No. 23163767.9, dated Jul. 8, 2023, 38 Pages.
International Preliminary Report on Patentability for International Application No. PCT/US2021/062322, dated Jun. 22, 2023, 8 Pages.
International Preliminary Report on Patentability for International Application No. PCT/US2021/062367, dated Jun. 22, 2023, 7 Pages.
Miroslav Z., "Special Light Milling Head Produced by 3D Metal Printing," Regional Technological Institute, Faculty of Mechanical Engineering, University of West Bohemia, Univerzitni 8, 306 14 Plzen, Czech Repulic, May 7, 2022, 4 Pages.
Aug. 18, 2023 Foreign Office Action European Application No. EP20200190517, 38 Pages.
Oct. 5, 2023 Non-Final Office Action U.S. Appl. No. 17/702,399, 8 Pages.

* cited by examiner

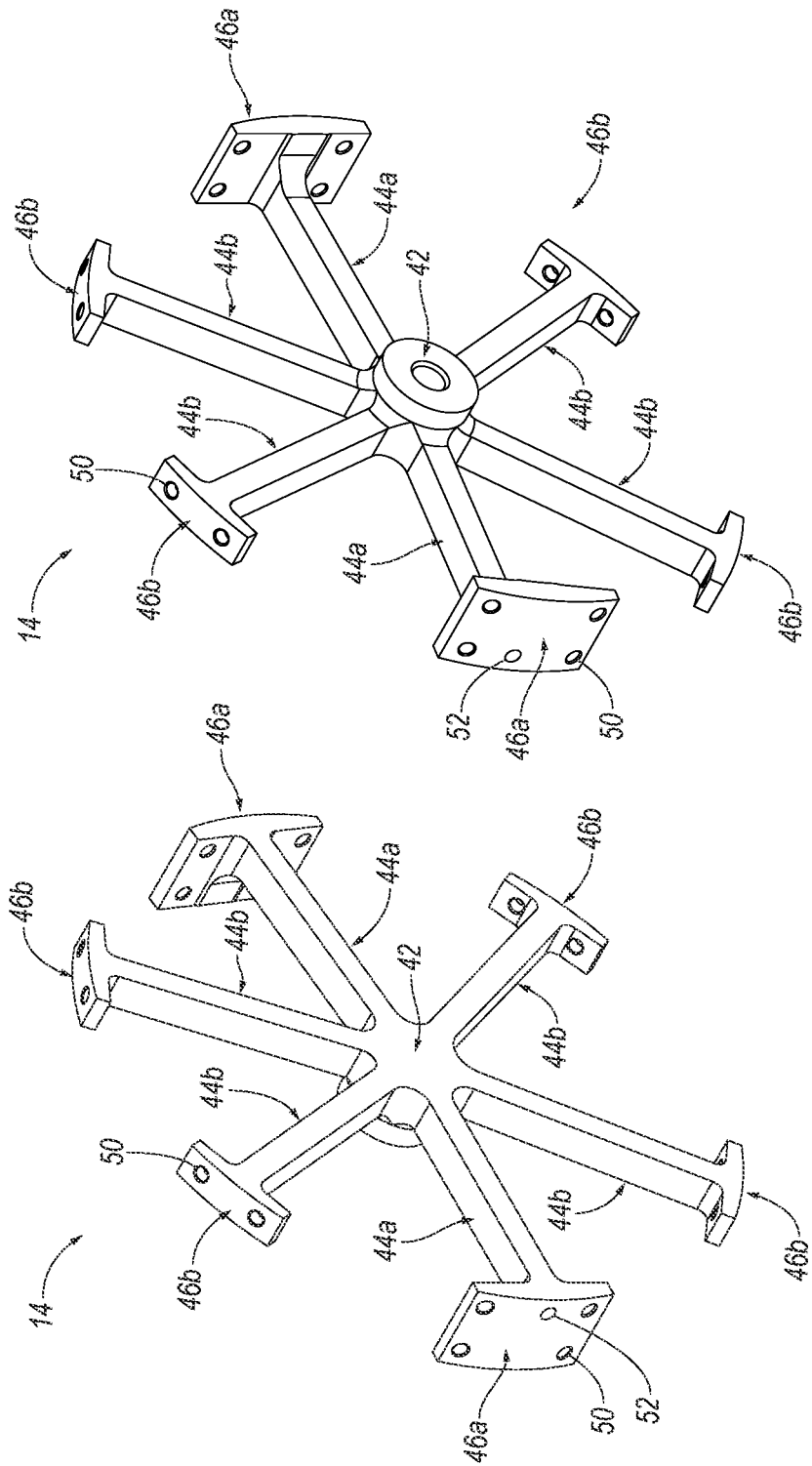

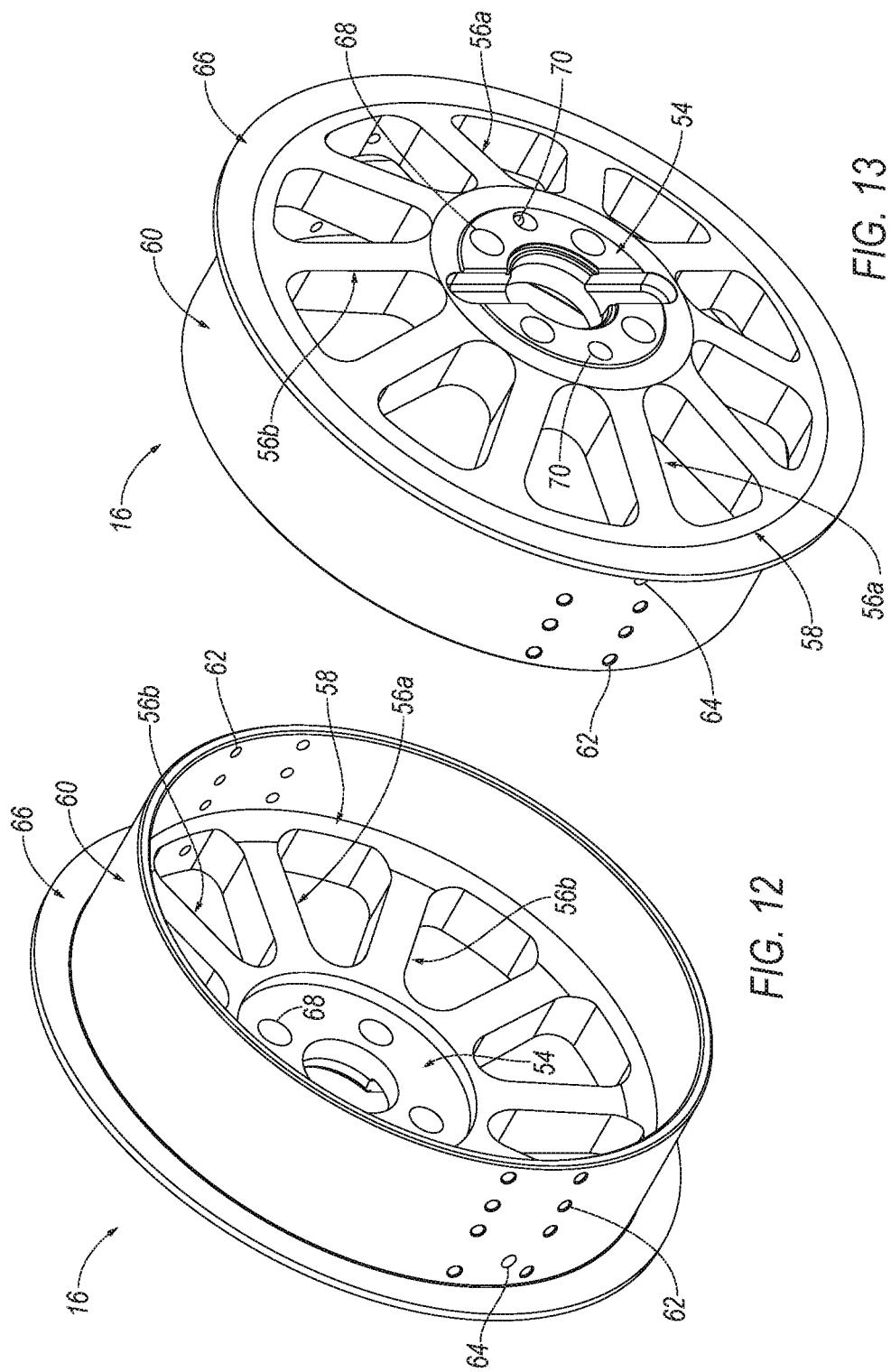

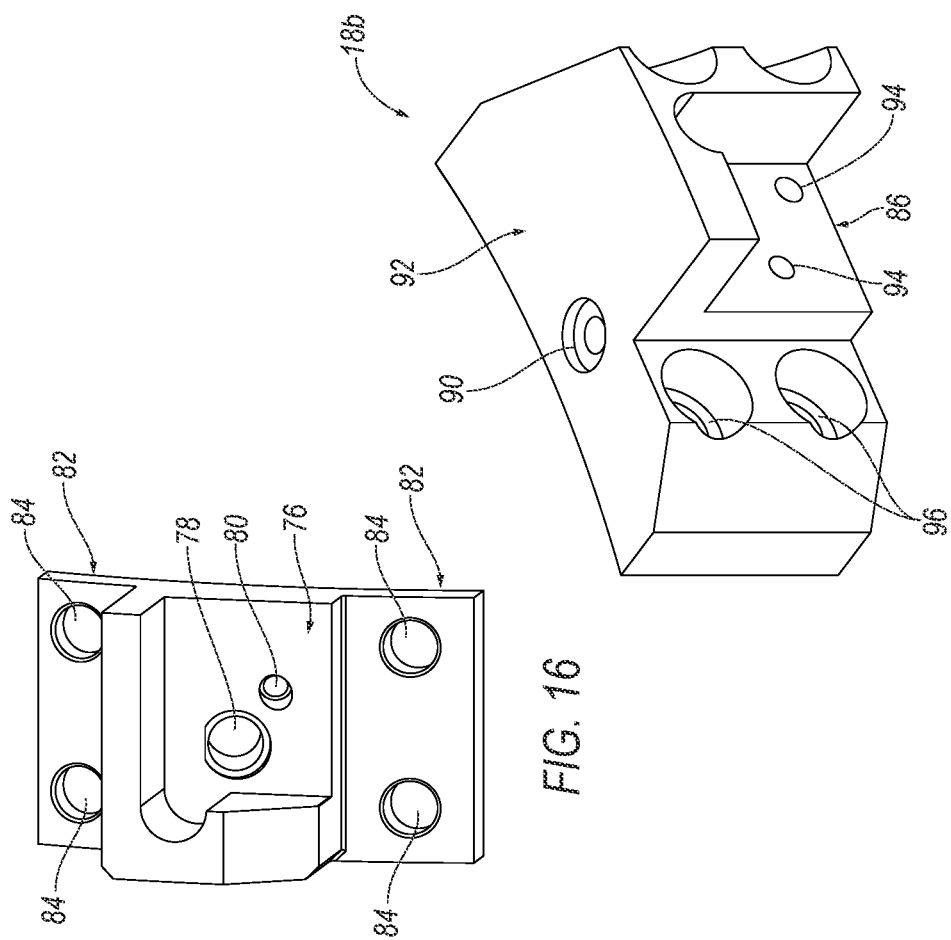
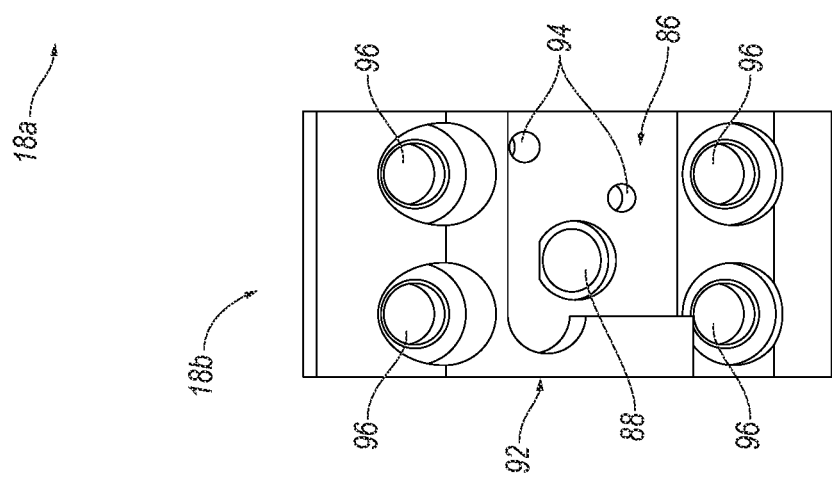

COMPOSITE CUTTING TOOL

FIELD OF THE INVENTION

In general, the invention relates to cutting tools, and more particularly, to a composite cutting tool, such as a reamer, a milling cutter, a slotting cutter, and the like, with a tubular body made of composite material, such as carbon fiber reinforced polymer (CFRP), and the like, to increase the stiffness to weight ratio of the lightweight composite cutting tool.

BACKGROUND OF THE INVENTION

During a cutting operation, it is essential to prevent unwanted movement of the cutting tool. It has been observed that a rotary cutting tool, for example, a reamer, a slotting cutter, and the like, may not have the desired stiffness to prevent unwanted movement during a cutting operation. In addition, large cutting tools are typically too heavy for tool changers to properly handle. Thus, it would be desirable to reduce the weight of large cutting tools, while maintaining or increasing stiffness, thereby increasing the stiffness to weight ratio.

SUMMARY OF THE INVENTION

The problem of reducing the weight of a large cutting tool, such as a reamer, a milling cutter, a slotting cutter, and the like, while maintaining or increasing the stiffness can be solved by providing a large cutting tool with a tubular body made of a composite material, such as carbon fiber reinforced polymer (CFRP), and the like. The lightweight composite cutting tool has one or more cartridge supports capable of receiving a cutting insert cartridge that is directly attached to the inside or to the outside of the composite tubular body.

In one aspect, a composite cutting tool comprises a tubular body. A rear support structure comprises a central hub and a plurality of spokes extending radially outward from the central hub. The rear support structure is attached to an inner surface of the tubular body. One or more cartridge supports are attached to the rear support structure. A rear machine connection member is attached to the rear support structure.

In another aspect, a composite cutting tool comprises a tubular body having an inner surface and an outer surface. A front support structure comprises a central hub and a plurality of spokes extending radially outward from the central hub. At least one slot extends through the inner surface and the outer surface of the tubular body. A front cartridge support is received in the at least one slot. The front cartridge support is directly attached to the front support structure.

In yet another aspect, a composite cutting tool comprises a tubular body. A front support structure comprises a central hub and a plurality of spokes extend radially outward from the central hub. At least one slot extends through the inner surface and the outer surface of the tubular body. A front cartridge support is received in the at least one slot and directly attaches to the front support structure. A support ring structure is mounted on an outer surface of the tubular body. The support ring structure includes at least one recess capable of receiving a rear cartridge support. A rear support structure is attached to an inner surface of the tubular body. The rear support structure comprises a central hub and a plurality of spokes extending radially outward from the central hub. A rear machine connection member is attached to the rear support structure.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 8 is a front perspective view of the front support structure according to an embodiment of the invention;

FIG. 9 is a rear perspective view of the front support structure of FIG. 8;

FIG. 12 is a front perspective view of the rear support structure according to an embodiment of the invention;

FIG. 13 is a rear perspective view of the rear support structure of FIG. 12;

FIG. 16 is a front perspective view of the front cartridge support according to an embodiment of the invention;

FIG. 17 is a front perspective view of the first rear cartridge support according to an embodiment of the invention;

FIG. 18 is a side perspective view of the first rear cartridge support of FIG. 17;

DETAILED DESCRIPTION OF THE INVENTION

Figure 1:
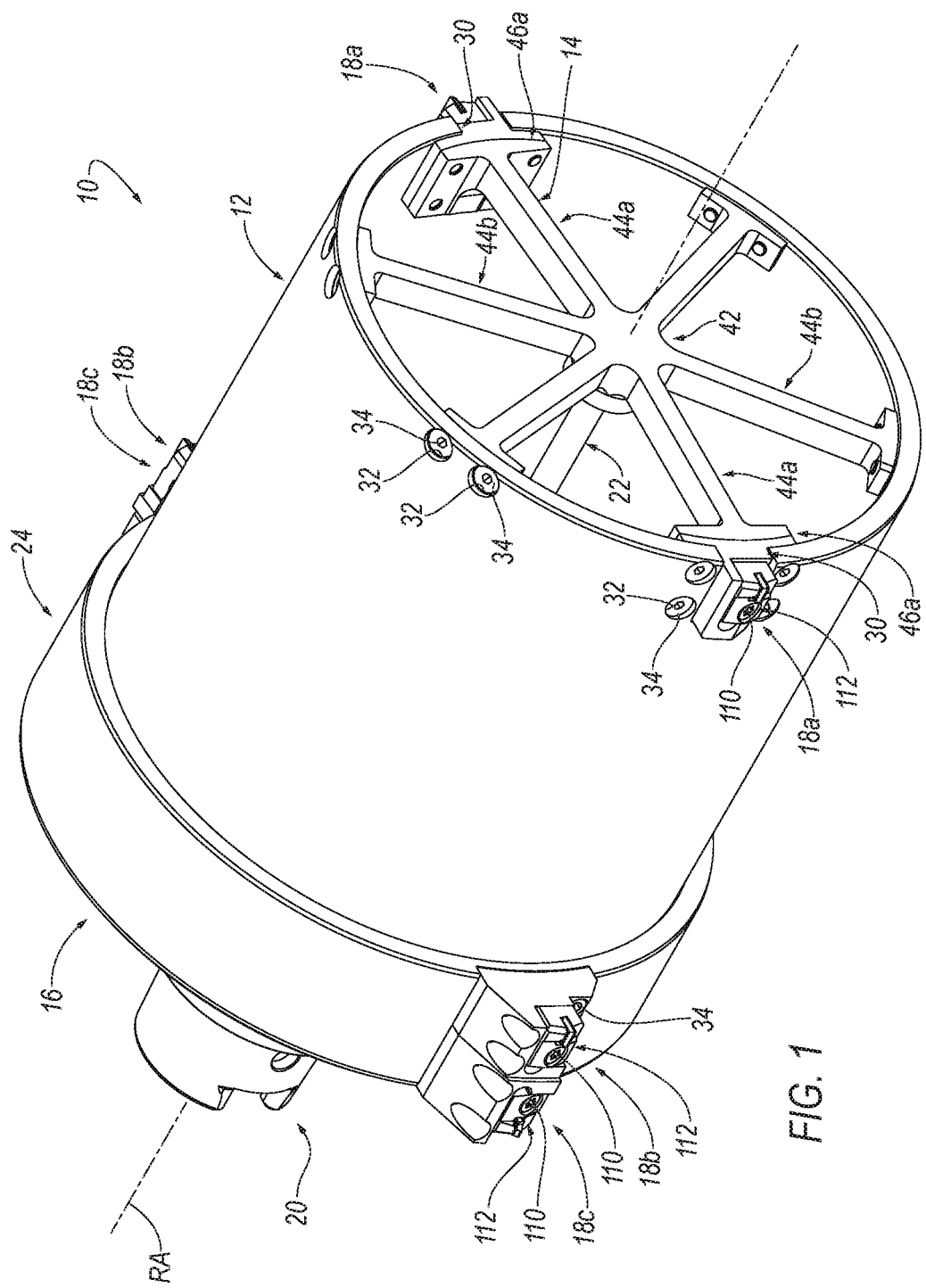
FIG. 1 is a front perspective view of a cutting tool, such as a lightweight reamer, according to an embodiment of the invention.

Referring now to FIGS. 1-6, a cutting tool 10 is shown according to an embodiment of the invention. In the illustrated embodiment, the large cutting tool comprises a reamer that rotates about a central, rotational axis, RA, during operation. Although the large cutting tool 10 comprises a reamer in the illustrated embodiment, it should be appreciated that the principles of the invention can be applied to any cutting tool for metal cutting operations, such as a milling cutter, and the like. In addition, the description herein of specific applications should not be a limitation on the scope and extent of the use of the cutting tool.

As shown in FIGS. 1-6, the cutting tool 10 of the invention has a modular design comprising five basic components:

1) a tubular body 12 having an inner surface (12a) and an outer surface (12b);
2) a front support structure 14;
3) a rear support structure 16;
4) one or more cartridge supports 18; and
5) a rear machine connection member 20.

The five basic components can be fastened to each other by using any well-known means in the art, such as mechanical fasteners, shrink fitting, brazing, soldering, welding, glue, epoxy, and the like. Alternatively, one or more of the five basic components can be integrally formed using additive manufacturing (i.e., 3D printing). An optional coolant conduit 22 can enable the large cutting tool 10 to provide fluid, such as coolant, and the like, from the rear machine connection member 20 to the front support structure 14, and ultimately to the cutting insert/workpiece interface.

In addition, an optional support ring structure 24 can provide additional stiffness to the cutting tool 10. In the illustrated embodiment, the support ring structure 24 is attached to the tubular body 12. However, it will be appreciated that the support ring structure 24 can be attached to the front support structure 14, the rear support structure 16, or any combination thereof.

Directional phrases used herein, such as, for example, left, right, front, rear, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

Referring now to FIGS. 1-3 and 7, the tubular body 12 is shown according to an embodiment of the invention. The tubular body 12 is made of a composite material, such as carbon fiber reinforced polymer (CFRP), and the like. In one aspect, the CFRP tubular body 12 drastically reduces the weight of the rotary cutting tool, as compared to a rotary cutting tool made entirely out of a different material, such as tool steel, and the like.

As is known in the art, carbon-fiber-reinforced polymers (American English), carbon-fibre-reinforced polymers (Commonwealth English), or carbon-fiber-reinforced plastics, or carbon-fiber reinforced-thermoplastic (CFRP, CRP, CFRTP, also known as carbon fiber, carbon composite, or just carbon), are extremely strong and light fiber-reinforced plastics that contain carbon fibers. The binding polymer is often a thermoset resin such as epoxy, but other thermoset or thermoplastic polymers, such as polyester, vinyl ester, or nylon, are sometimes used. The properties of the final CFRP product can be affected by the type of additives introduced to the binding matrix (resin). The most common additive is silica, but other additives such as rubber and carbon nanotubes can be used.

Figure 4:
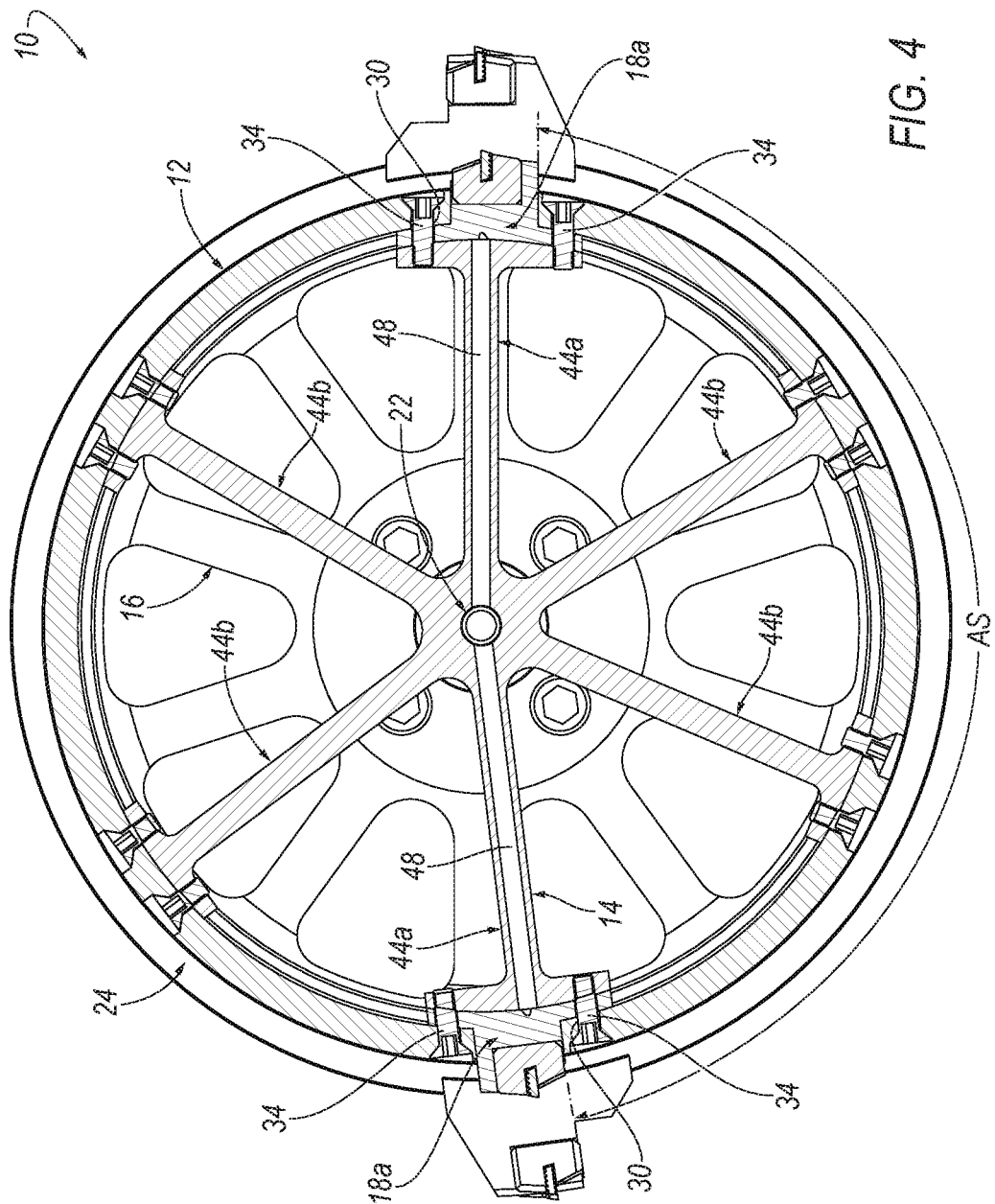
FIG. 4 is a cross-sectional view of the lightweight reamer taken along line 4-4 of FIG. 3.
Figure 6:
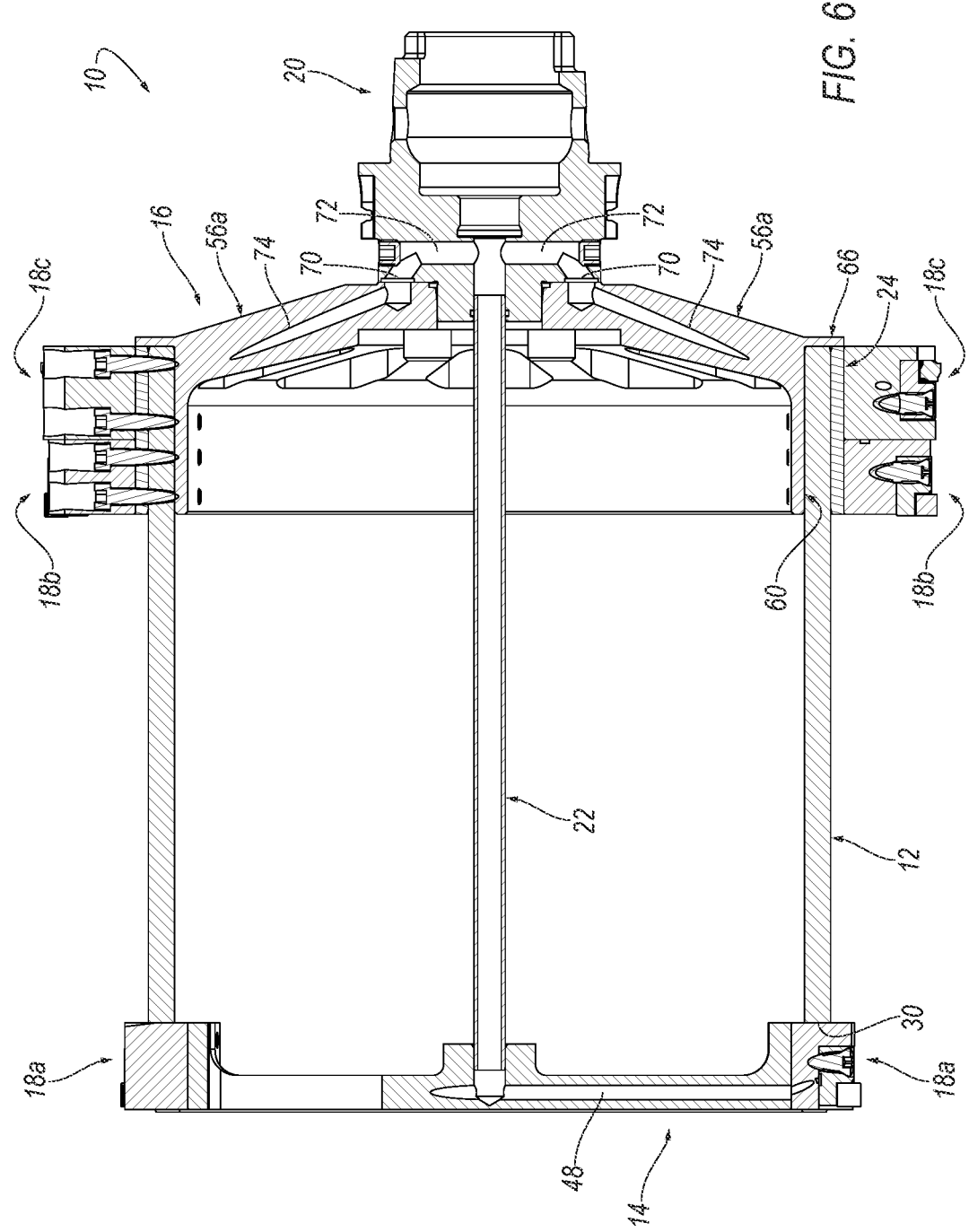
FIG. 6 is a cross-sectional view of the lightweight reamer taken along line 6-6 of FIG. 3.

The tubular body 12 has a forward or front end 26 and a rearward or rear end 28 opposite the front end 26. The tubular body 12 has an inner surface 12a and an outer surface 12b. The tubular body 12 includes one or more slots 30 extending through the inner surface 12a and the outer surface 12b. In the illustrated embodiment, the one or more slots 30 extend from the front end 26 and are capable of receiving a respective front cartridge support 18a, as shown in FIGS. 1, 4 and 6. In the illustrated embodiment, the tubular body 12 has two slots 30 that are disposed at an angle, AS, not equal to 180 degrees with respect to each other, but slightly different than 180 degrees, as shown in FIG. 4. For example, the angle, AS, can be in the range between from about 165 degrees to about 179 degrees. It has been found that mounting the front cartridge supports 18a at an angle, AS, not equal to 180 degrees helps reduce vibration of the cutting tool 10 during cutting operations.

The tubular body 12 also includes a plurality of countersunk bores 32 proximate the front end 26 of the tubular body 12. The purpose of the countersunk bores 32 is to receive a threaded fastener 34 for attaching the front support structure 14 to the tubular body 12, as shown in FIG. 1. It should be noted that the front cartridge support 18a is attached to the interior of the tubular body 12 and the outside of the front support structure 14. The threaded fastener 34 clamps the front cartridge support 18a between the tubular body 12 and the front support structure 14. In other words, the front support structure 18a is disposed between the tubular body 12 and the front support structure 14, as shown in FIG. 1.

Figure 5:
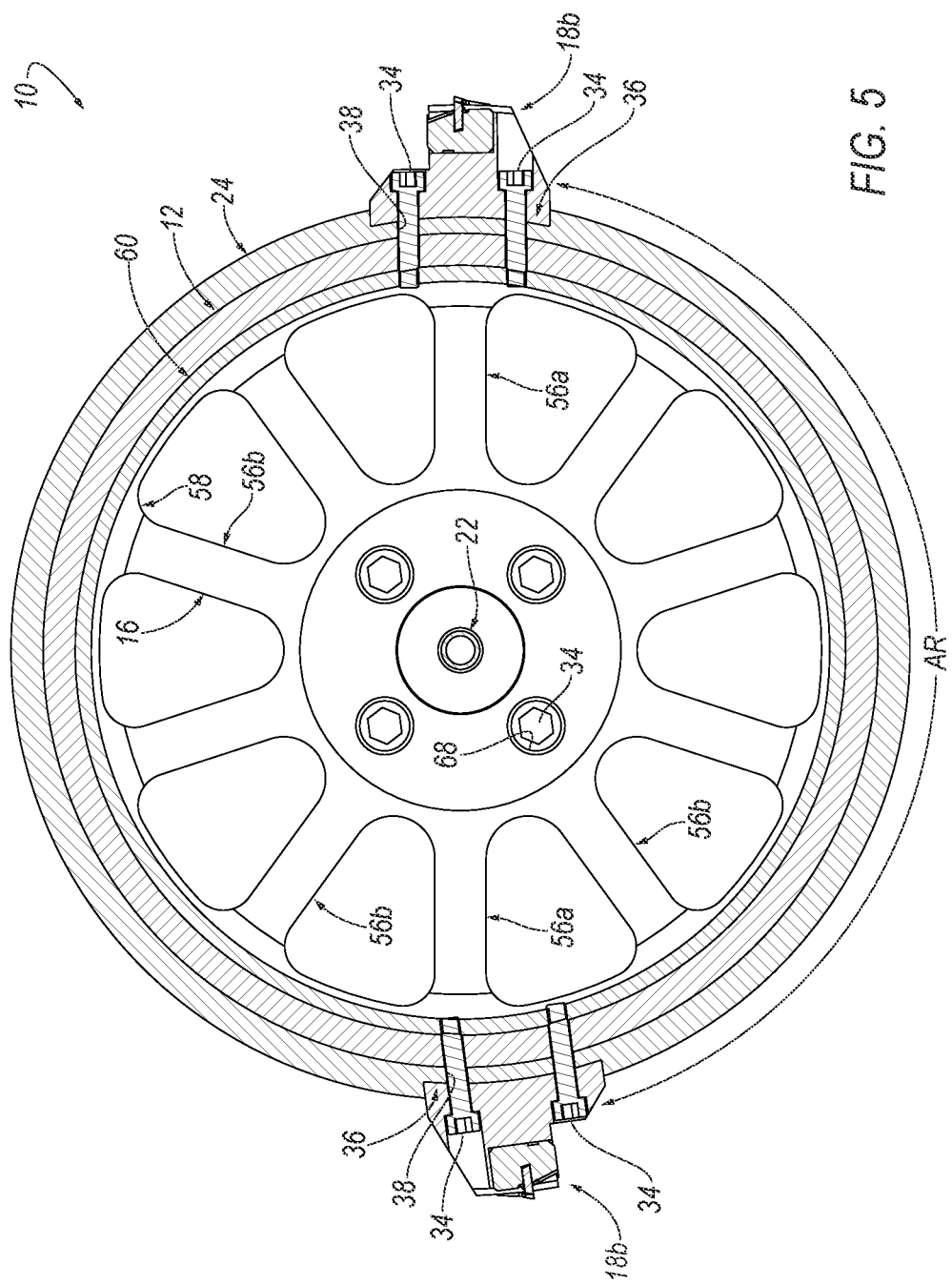
FIG. 5 is a cross-sectional view of the lightweight reamer taken along line 5-5 of FIG. 3.
Figure 7:
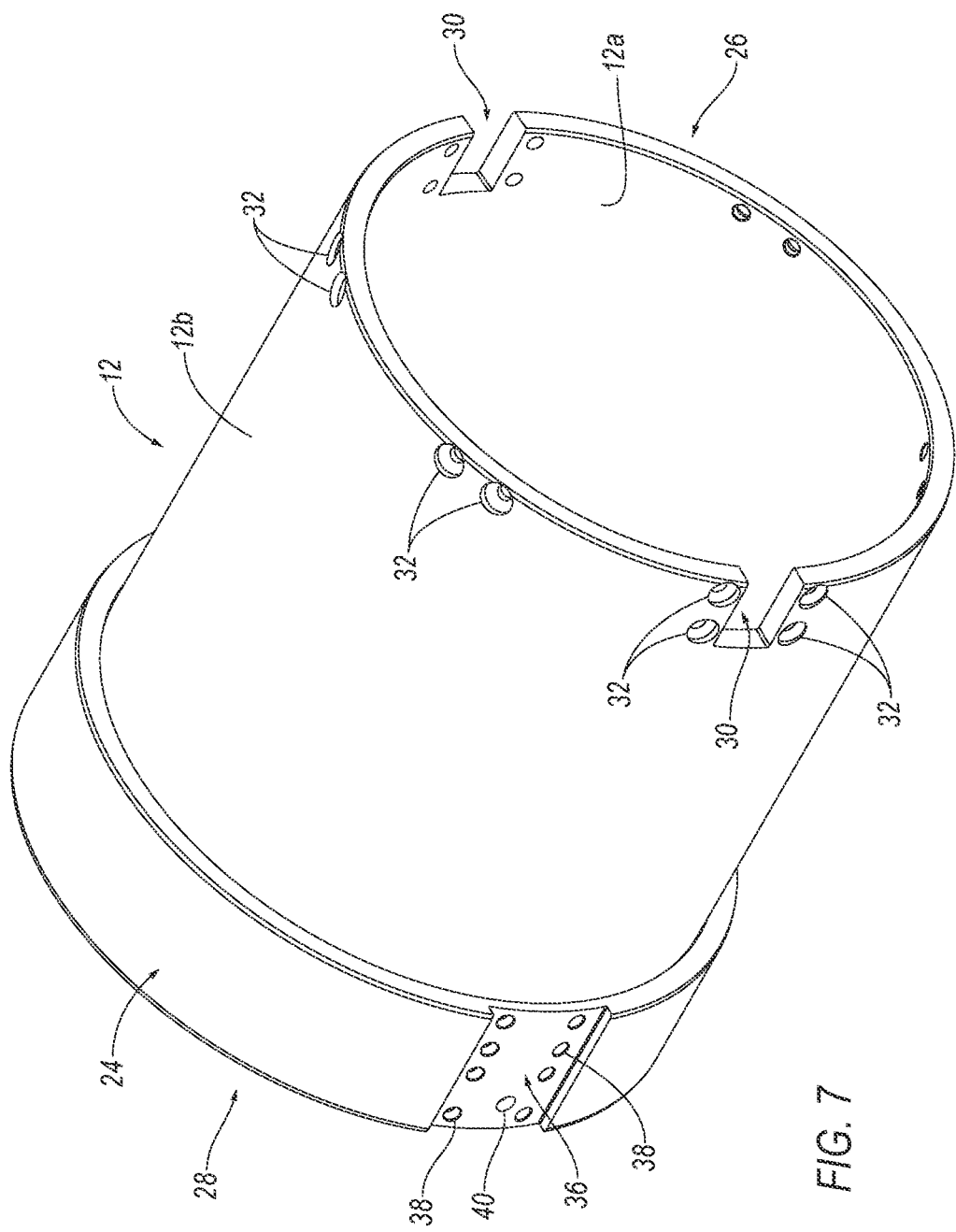
FIG. 7 is a front perspective view of the tubular member and the support ring structure according to an embodiment of the invention.
Figure 11:
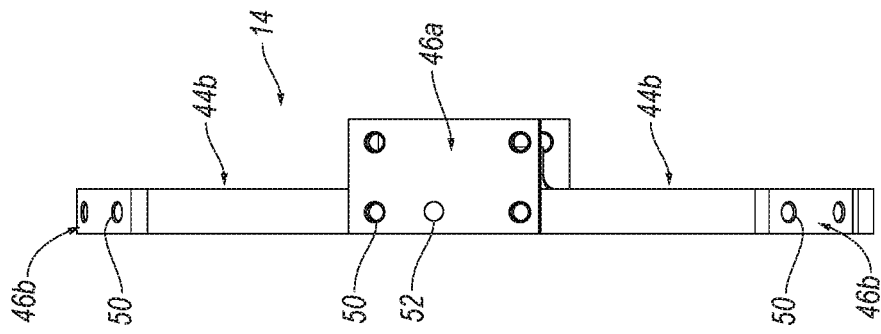
FIG. 11 is a side elevational view of the front support structure of FIG. 8.
Figure 10:
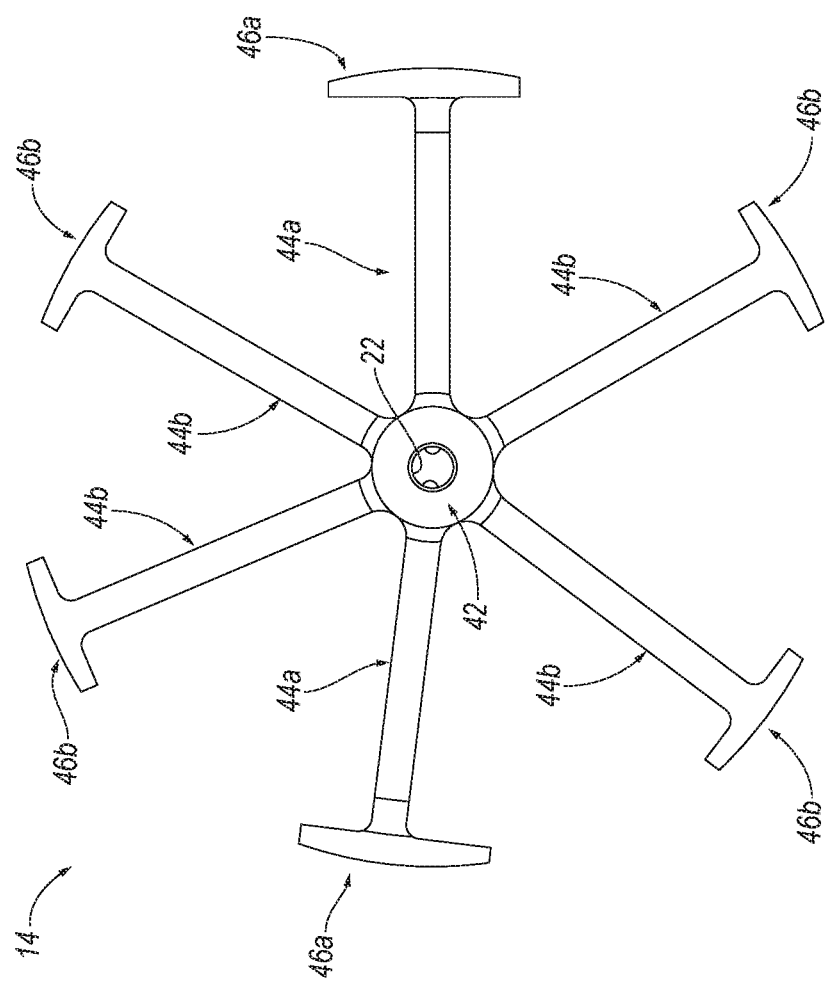
FIG. 10 is a rear elevational view of the front support structure of FIG. 8.
Figure 15:
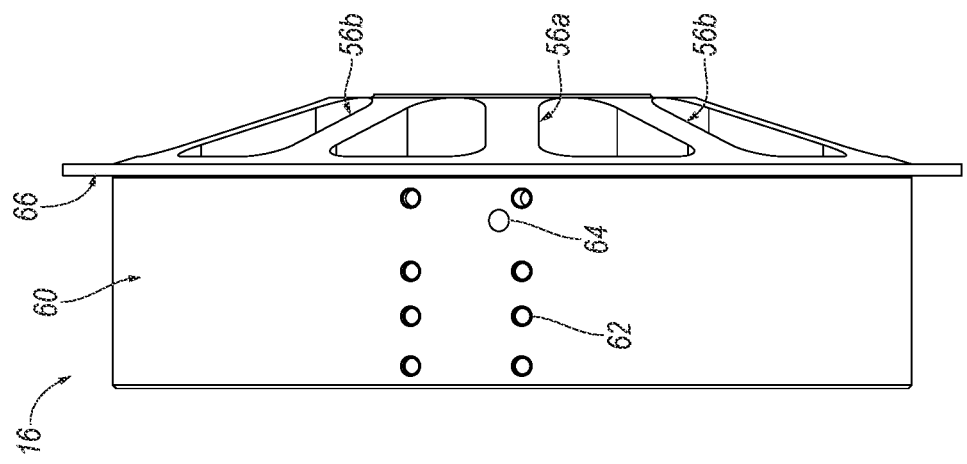
FIG. 15 is a side elevational view of the rear support structure of FIG. 12.
Figure 14:
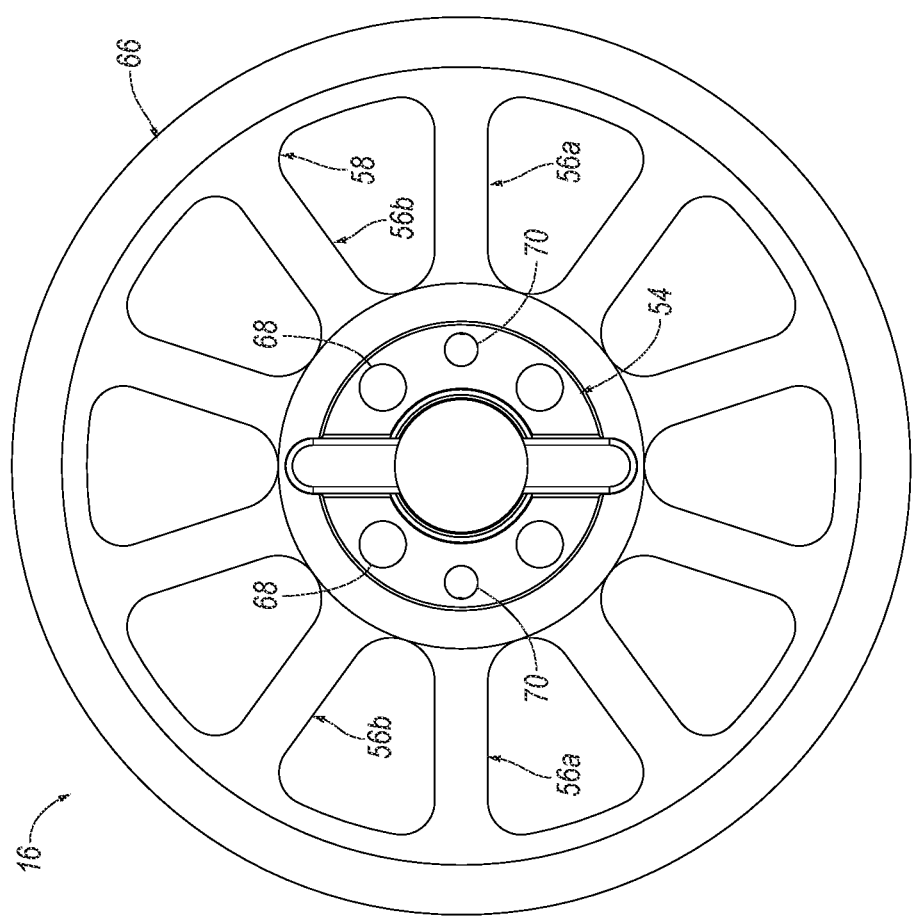
FIG. 14 is a rear view of the rear support structure of FIG. 12.

Referring now to FIG. 7, the support ring structure 24 is disposed proximate the rear end 28 of the tubular body 12. In the illustrated embodiment, the support ring structure 24 has a recess 36 capable of receiving one or more first, rear cartridge supports 18b and one or more second, rear cartridge supports 18c, as shown in FIG. 1. Each recess 36 acts as a seat for a respective cartridge support 18b, 18c. Similar to the slots 30, the support ring structure 24 has two recesses 36 that are disposed at an angle, AR, not equal to 180 degrees, as shown in FIG. 5. For example, the angle, AR, can be in the range between from about 165 degrees to about 179 degrees. It has been found that disposing the first and second rear cartridge supports 18b, 18c at an angle, AR, not equal to 180 degrees helps reduce vibration of the cutting tool 10 during cutting operations.

Figure 2:
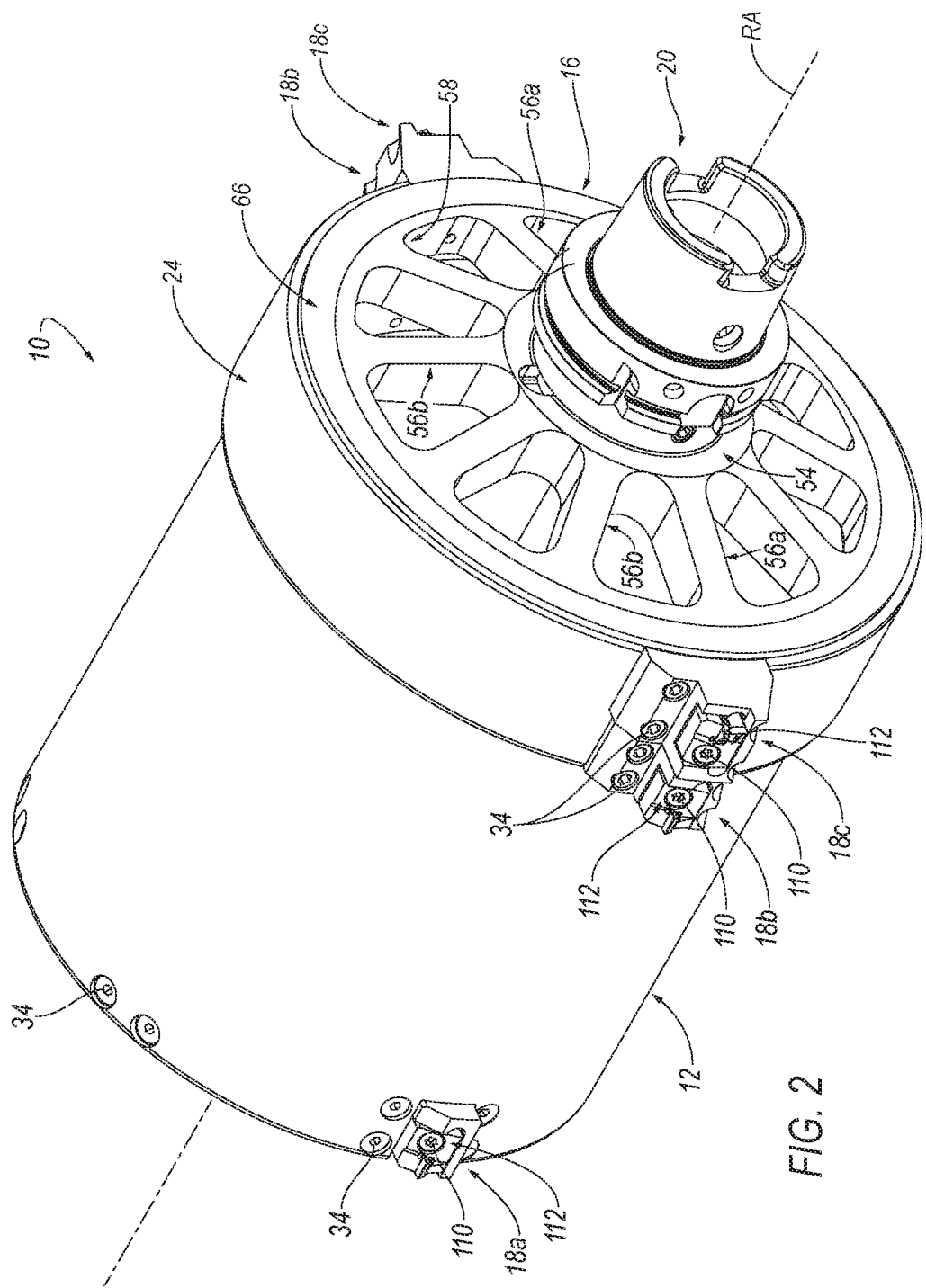
FIG. 2 is a rear perspective view of the lightweight reamer of FIG. 1.
Figure 3:
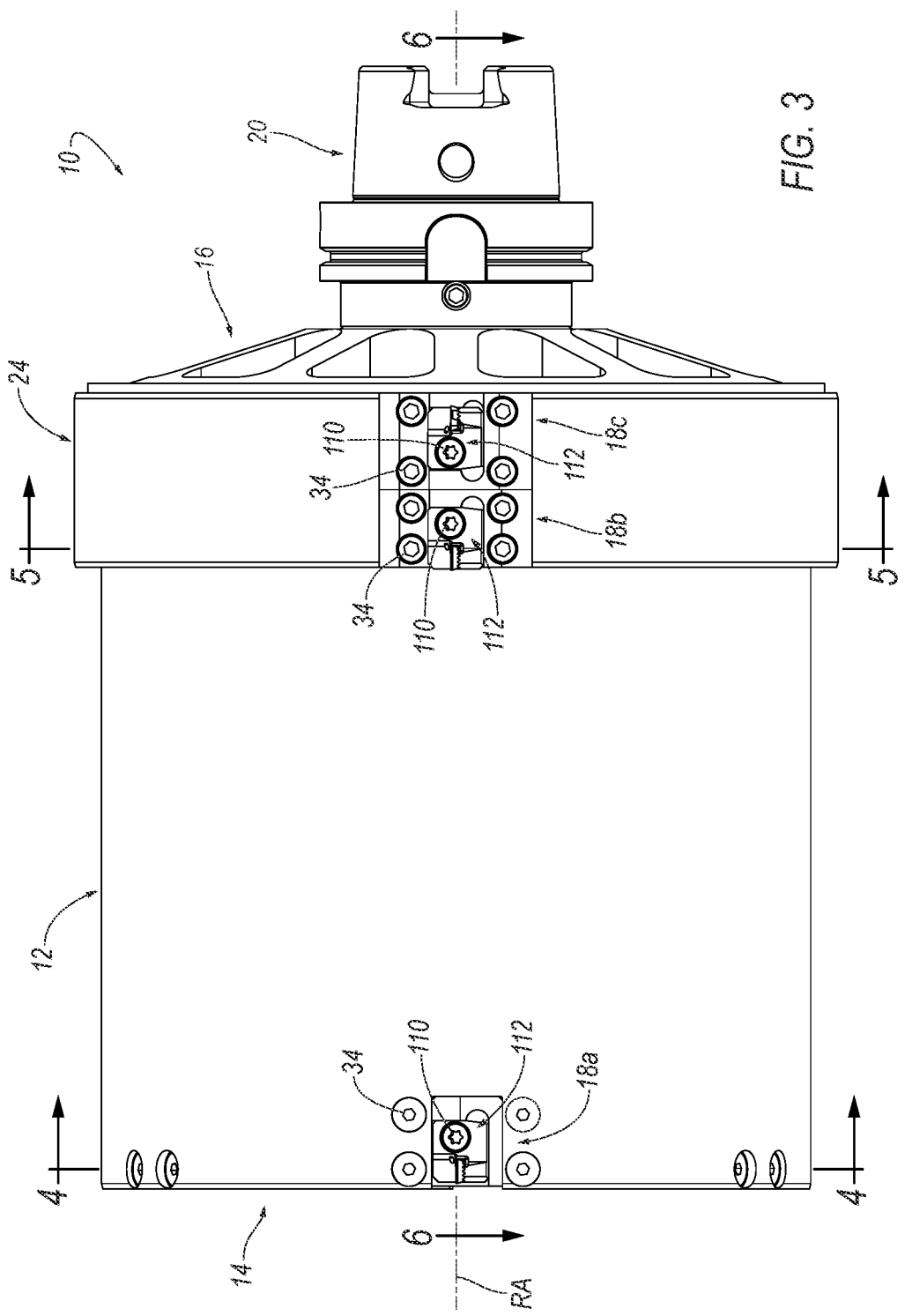
FIG. 3 is a side elevational view of the lightweight reamer of FIG. 1.

Each recess 36 has one or more apertures 38 for receiving a threaded fastener 34 for attaching a respective first and second rear cartridge support 18b, 18c to the support ring structure 24, as shown in FIGS. 2 and 7. Thus, the first and second rear cartridge supports 18b, 18c are attached to an exterior of the support ring structure 24, as opposed to the front cartridge support 18a that is attached to the interior of the tubular body 12 and the outside of the front support structure 14. Each recess 36 may include an optional coolant hole 40 for providing coolant from the rear machine connection member 20 to the first and second rear cartridge supports 18b, 18c. It should be noted that the first rear cartridge support 18b is located axially forward (i.e., closer to the front support structure 14) with respect to the second rear cartridge support 18c, as shown in FIGS. 1-3.

It should be appreciated that the invention is not limited by the location of the slots 30 and the recesses 36 as shown in the illustrated embodiment. For example, the slots 30 can be located at any location between the front end 26 and the rear end 28 of the tubular body 12. For example, one or more slots 30 can be located in the middle area of the tubular body 12. Similarly, the support ring structure 24 and the recesses 36 formed therein can be at any desired location between the front end 26 and the rear end 28 of the tubular body 12. For example, the support ring structure 24 and the recesses 36 can be located at the middle area of the tubular body 12.

In addition, it should be appreciated that the invention is not limited by the location at which the cartridge supports 18a, 18b, 18c are attached to the tubular body 12, and that the invention can be practiced by attaching the front cartridge support 18a to the outer surface 12b of the tubular body 12, similar to the first and second rear cartridge supports 18b, 18c. In addition, the invention can be practiced by attaching the first and second rear cartridge supports 18b, 18c to the inner surface 12a of the tubular body 12, similar to the front cartridge support 18a.

Referring now to FIGS. 8-11, the front support structure 14 is shown according to an embodiment of the invention. Basically, the front support structure 14 comprises a hub and spoke design that includes a central hub 42 with a plurality of spokes 44 extending radially outward from the central hub 42. In the illustrated embodiment, the front support structure 14 has a total of six spokes 44. However, the invention is not limited by the number of spokes 44, and that the invention can be practiced with any desirable number of spokes 44, depending on the design requirements. The front support structure 14 can be made of any suitable lightweight material, such as aluminum, and the like.

In the illustrated embodiment, there are two types of spokes 44: a first spoke type 44a with a first radial pad type 46a, and a second spoke type 44b with a second radial pad type 46b.

The first spoke type 44a is generally hollow with a coolant conduit 48 in fluid communication with the coolant conduit 22. As shown in FIGS. 4 and 6, the coolant conduit 22 is capable of transporting coolant from the rear machine connection member 20 to the central hub 42 of the front support structure 14, as shown in FIGS. 4 and 6. The first radial pad type 46a has a plurality of apertures 50 capable of receiving the threaded fastener 34 for attaching directly to the front cartridge support 18a. The first radial pad type 46a also has a coolant exit hole 52 for supplying coolant traveling from the central hub 42, through the coolant conduit 48, and to the front cartridge support 18a.

It should be noted that there is a one-to-one correspondence between the number of first spoke types 44a with coolant conduit 48 and the number of front cartridge supports 18a. In the illustrated embodiment, the front support structure 14 has a total number of two first spoke types 44a (and two coolant conduits 48) that correspond to the total number of front cartridge supports 18a. However, it will be appreciated that the invention is not limited by the number of front cartridge supports 18a, and that the invention can be practiced with any desirable number of front cartridge supports 18a, depending on the design requirements.

Because the first spoke type 44a is substantially radially aligned with the front cartridge support 18a disposed within the slot 30, the first spoke type 44a are also disposed at the angle, AS, not equal to 180 degrees with respect to each other, but slightly different than 180 degrees, as shown in FIG. 4. For example, the angle, AS, can be in the range between from about 165 degrees to about 179 degrees. In addition, the angular spacing between two adjacent second spoke types 44b may not be equal to the angular spacing between a first spoke type 44a and an adjacent second spoke type 44b. In other words, the spokes 44 may be unequally spaced with respect to each other to reduce vibration during cutting operations.

Unlike the first spoke type 44a, the second spoke type 44b is solid, and therefore does not transport coolant from the central hub 42 to the front cartridge support 18a. In addition, the second radial pad type 46b is smaller in surface area as compared to the first radial pad type 46a. This is because the second radial pad type 46b is attached directly to the tubular body 12, rather than to the front cartridge support 18a as in the first radial pad type 46a, as shown in FIG. 1.

It should be appreciated that the invention is not limited by the number of first and second spoke types 44a, 44b, and that the invention can be practiced with any desirable number of spoke types, depending on design requirements. For example, the invention can be practiced by eliminating the first spoke type 44a such that all the spokes 44 are solid. In another example, the invention can be practiced by eliminating the second spoke type 44b such that all the spokes 44 are hollow, and therefore capable of transporting coolant therethrough.

Referring now to FIGS. 5, and 12-15, the rear support structure 16 is shown according to an embodiment of the invention. Similar to the front support structure 14, the rear support structure 16 comprises a hub and spoke design that includes a central hub 54 with a plurality of spokes 56 extending radially outward from the central hub 54 and terminating at a circumferential support ring 58. In the illustrated embodiment, the rear support structure 16 has a total of ten spokes 56. However, the invention is not limited by the number of spokes 56, and that the invention can be practiced with any desirable number of spokes 56, depending on the design requirements. The rear support structure 16 can be made of any suitable lightweight material, such as aluminum, and the like.

The central hub 54 has a plurality of apertures 68 capable of receiving a threaded fastener 34 when attaching the rear support structure 16 to the rear machine connection member 20. In addition, the central hub 54 has one or more coolant inlet holes 70 in fluid communication with a coolant supply channel 72, for example, a high-pressure coolant supply, and the like, traveling through the rear machine connection member 20 (FIG. 6).

In the illustrated embodiment, there are two types of spokes 56: a first spoke type 56a and a second spoke type 56b. The first spoke type 56a is generally hollow with a coolant conduit 74 in fluid communication with the coolant supply channel 72 in the rear machine connection member 20 (FIG. 6). As shown in FIG. 6, the coolant conduit 74 is capable of transporting coolant from the coolant supply channel 72 of the rear machine connection member 20, to the second rear cartridge support 18c of the rear support structure 16.

It should be noted that there is a one-to-one correspondence between the number of first spoke types 56a with coolant conduit 74 and the number of second rear cartridge supports 18c. In the illustrated embodiment, the rear support structure 16 has a total number of two first spoke types 56a (and two coolant conduits 74) that correspond to the total number of second rear cartridge supports 18c. However, it will be appreciated that the invention is not limited by the number of first and second rear cartridge supports 18b, 18c, and that the invention can be practiced with any desirable number of first and second rear cartridge supports 18b, 18c, depending on the design requirements.

Unlike the first spoke type 56a, the second spoke type 56b is solid, and therefore does not transport coolant from the rear machine connection member 20 to the second rear cartridge support 18c. It should be appreciated that the invention is not limited by the number of first and second spoke types 56a, 56b, and that the invention can be practiced with any desirable number of spoke types, depending on design requirements. For example, the invention can be practiced by eliminating the first spoke type 56a such that all the spokes 56 are solid. In another example, the invention can be practiced by eliminating the second spoke type 56b such that all the spokes 56 are hollow, and therefore capable of transporting coolant therethrough.

Because the first rear spoke type 56a is substantially radially aligned with the first and second cartridge supports 18b, 18c mounted within the recess 36, the first spoke types 56a are also disposed at the angle, AR, not equal to 180 degrees with respect to each other, but slightly different than 180 degrees, as shown in FIG. 5. For example, the angle, AR, can be in the range between from about 165 degrees to about 179 degrees. In addition, the angular spacing between two adjacent second spoke types 56b may not be equal to the angular spacing between a first spoke type 56a and an adjacent second spoke type 56b. In other words, the spokes 44 may be unequally spaced with respect to each other to reduce vibration during cutting operations.

The rear support structure 16 further includes a pilot ring 60 extending axially from the circumferential support ring 58 in an axially forward direction (i.e., toward the front support structure 14). The purpose of the pilot ring 60 is to act as a guide when the rear support structure 16 is being inserted into the tubular body 12. The pilot ring 60 includes a plurality of apertures 62 capable of being aligned with the apertures 38 (FIG. 7) in the support ring structure 24 such that the threaded fastener 34 (FIGS. 1 and 2) can pass therethrough when attaching the first and second rear cartridge supports 18b, 18c to the cutting tool 10.

In addition, the pilot ring 60 has a coolant hole 64 capable of being aligned with the coolant hole 40 (FIG. 7) in the support ring structure 24 such that coolant can be transferred from the rear machined connection member 20 to the second rear cartridge support 18c. The rear support structure 16 also includes a flange 66 extending radially from the pilot ring 60 that acts as a stop when inserting the rear support structure 16 into the tubular body 12 during assembly.

Referring now to FIG. 16, the front cartridge support 18a is shown according to an embodiment of the invention. The front cartridge support 18a includes a pocket 76 configured for receiving a cutting insert cartridge 112 (FIGS. 1-3). The pocket 76 has a threaded aperture 78 capable of receiving a mounting screw 110 for mounting the cutting insert cartridge 112 in the pocket 76. The pocket 76 also has a coolant exit hole 80 in fluid communication with the coolant hole 52 formed in the first radial pad type 46a of the front support structure 14 to provide coolant to the cutting insert/workpiece interface. The pocket 76 is located between a pair of flanges 82 extending outward from the pocket 76. The flanges 82 are disposed between the inside wall of the tubular body 12 and the first radial pad type 46a of the front support structure 14. Each flange 82 include one or more apertures 84 capable of receiving the threaded fastener 34 to directly attach the front support structure 14 to the first radial pad type 46a of the front support structure 14.

Referring now to FIGS. 17 and 18, the first rear cartridge support 18b is shown according to an embodiment of the invention. As mentioned earlier, the first rear cartridge support 18b is located axially forward (i.e., closer to the front support structure 14) with respect to the second rear cartridge support 18c. The first rear cartridge support 18b includes a pocket 86 configured for receiving a cutting insert cartridge 112 (FIGS. 1-3). The pocket 86 has a threaded aperture 88 capable of receiving a mounting screw 110 (FIGS. 1-3) for mounting the cutting insert cartridge 112 in the pocket 86.

The first rear cartridge support 18b also includes a coolant inlet hole 90 in a side wall 92 proximate and adjacent the second rear cartridge support 18c. The coolant inlet hole 90 is in fluid communication with the second rear cartridge support 18c and is capable of receiving a sealing member (not shown), such as an O-ring, and the like. The coolant inlet hole 90 provides coolant from the second rear cartridge support 18c to one or more coolant exit holes 94 formed in the pocket 86 and to the cutting insert/workpiece interface. The first rear cartridge support 18b also includes one or more apertures 96 capable of receiving the threaded fastener 34 to directly attach the first rear support structure 18b to the support ring structure 24, as shown in FIGS. 1 and 2.

Figure 19:
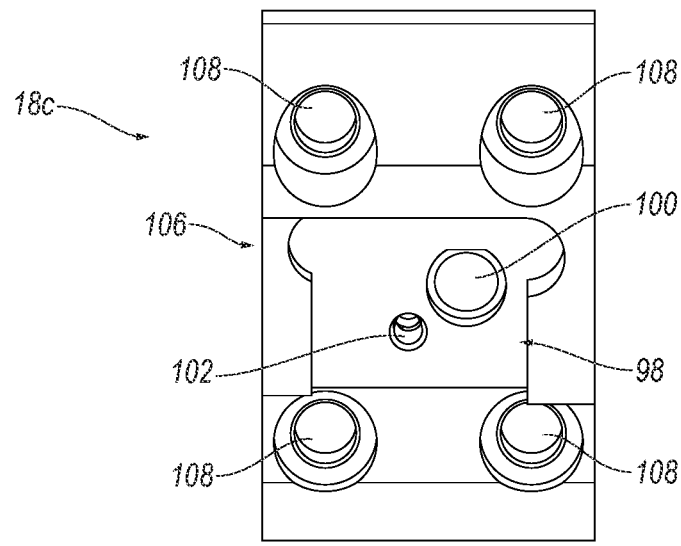
FIG. 19 is a front perspective view of the second rear cartridge support according to an embodiment of the invention.
Figure 20:
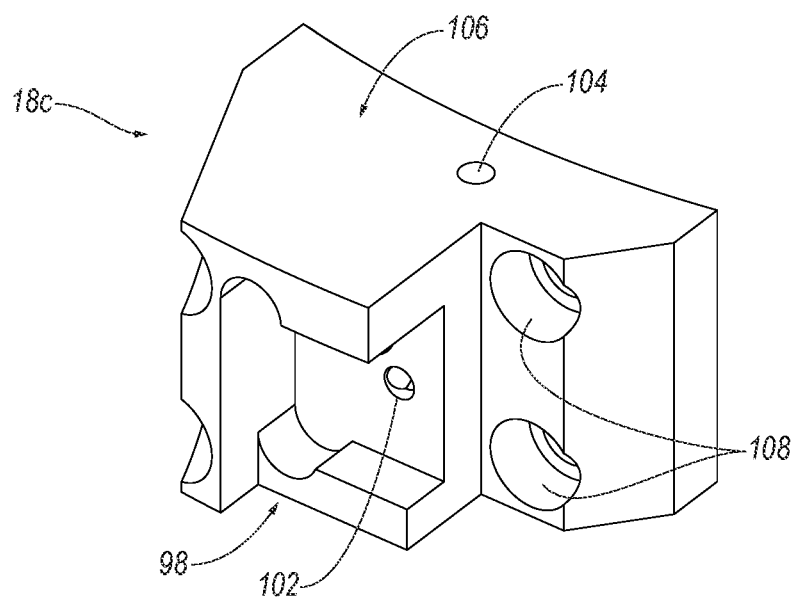
FIG. 20 is a side perspective view of the second rear cartridge support of FIG. 19.

Referring now to FIGS. 19 and 20, the second rear cartridge support 18c is shown according to an embodiment of the invention. The second rear cartridge support 18c is located axially rearward (i.e., closer to the rear support structure 16) with respect to the first rear cartridge support 18b. The second rear cartridge support 18c includes a pocket 98 configured for receiving a cutting insert cartridge 112 (FIGS. 1-3). The pocket 98 has a threaded aperture 100 capable of receiving a mounting screw 110 (FIGS. 1-3) for mounting the cutting insert cartridge 112 in the pocket 98. The pocket 98 also includes one or more coolant exit holes 102 in fluid communication with the coolant conduit 74 formed in the first spoke type 56a of the rear support structure 16 to provide coolant to the cutting insert/workpiece interface. The second rear cartridge support 18c also includes a coolant exit hole 104 in a side wall 106 proximate and adjacent the coolant inlet hole 90 formed in the side wall 92 of the first rear cartridge support 18b. The second rear cartridge support 18c also includes one or more apertures 108 capable of receiving the threaded fastener 34 to directly attach the second rear support structure 18c to the support ring structure 24, as shown in FIGS. 1 and 2.

It should be appreciated that the invention is not limited by the second rear cartridge support 18c being in fluid communication with the coolant conduit 74 of the first spoke type 56a of the rear support structure 16, and that the invention can be practiced with the first rear cartridge support 18b being in fluid communication with the coolant conduit 74.

It should also be appreciated that the invention is not limited by the number of front support structures 14 and rear support structures 16, and that the invention can be practiced with any desirable number of front support structures 14 and rear support structures 16, depending on the dimensions of the cutting tool 10. In addition, the invention is not limited by the location of the front support structure 14 and/or the rear support structure 16, and that the invention can be practiced with the front support structure 14 and/or the rear support structure 16 attached at any desirable location between the front end and the rear end of the tubular body 12. For example, the invention can be practiced with the front support structure 14 and/or the rear support structure 16 attached to a middle section of the tubular body 12.

As described above, the tubular body 12 of the cutting tool 10 made of composite material, such as CFRP, and the like, significantly reduces the weight of the cutting tool 10, as compared to a conventional cutting tool made entirely out of steel, while maintaining or increasing stiffness of the cutting tool 10. As a result, the stiffness to weight ratio of the cutting tool 10 is significantly increased. In addition, the cartridge supports 18a, 18b, 18c can be attached either to the inside or the outside of the tubular body 12, depending on design requirements. Further, the rear machine connection member 20 provides coolant to the cartridge supports 18a, 18b, 18c.

The patents and publications referred to herein are hereby incorporated by reference.

Having described presently preferred embodiments the invention may be otherwise embodied within the scope of the appended claims.

What is claimed is:

1. A composite cutting tool, comprising: a tubular body having an inner surface and an outer surface, the tubular body defined by a long, hollow tube having a length along a rotational axis of the cutting tool greater than a thickness of the tubular body; a rear support structure comprising a central hub and a plurality of spokes extending radially outward from the central hub, the rear support structure attached to the inner surface of the tubular body; one or more rear cartridge supports extending radially outward from the tubular body and attached to the rear support structure; and a rear machine connection member attached to the rear support structure.

2. The cutting tool of claim 1, wherein the plurality of spokes of the rear support structure comprises a first spoke type and a second spoke type, the first spoke type capable of transporting coolant from the central hub of the rear support structure to the one or more rear cartridge supports.

3. The cutting tool of claim 1, wherein the one or more rear cartridge supports comprises a first rear cartridge support and a second rear cartridge support.

4. The cutting tool of claim 3, wherein the first rear cartridge support includes a pocket capable of receiving a cutting insert cartridge and a coolant hole in fluid communication with the rear machine connection member for providing coolant to a cutting insert/workpiece interface.

5. The cutting tool of claim 3, wherein the second rear cartridge support includes a pocket capable of receiving a cutting insert cartridge and a coolant exit hole in fluid communication with the first rear cartridge support for providing coolant to a cutting insert/workpiece interface.

6. The cutting tool of claim 1, further comprising a support ring structure mounted on an outer surface of the tubular body.

7. The cutting tool of claim 6, wherein the support ring structure includes at least one recess capable of receiving the one or more rear cartridge supports.

8. The cutting tool of claim 7, wherein the support ring structure includes at least two recesses disposed at an angle (AR) not equal to 180 degrees with respect to each other.

9. The cutting tool of claim 1, further comprising a front support structure comprising a central hub and a plurality of spokes extending radially outward from the central hub, wherein a front cartridge support is directly attached to the front support structure.

10. The cutting tool of claim 9, wherein the plurality of spokes of the front support structure comprises a first spoke type and a second spoke type, the first spoke type capable of transporting coolant from the central hub of the front support structure to the front cartridge support.

11. The cutting tool of claim 10, wherein the tubular body includes at least one slot extending through the tubular body, the at least one slot capable of receiving the front cartridge support.

12. The cutting tool of claim 11, wherein the tubular body includes at least two slots disposed at an angle (AS) not equal to 180 degrees with respect to each other.

13. The cutting tool of claim 9, further comprising a coolant conduit extending from the rear machine connection member to the front support structure for providing coolant to the front support structure.

14. The cutting tool of claim 9, wherein the front cartridge support includes a pocket capable of receiving a cutting insert cartridge and a coolant exit hole in fluid communication with the rear machine connection member for providing coolant to a cutting insert/workpiece interface.

15. The cutting tool of claim 1, wherein the cutting tool comprises a reamer.

16. A composite cutting tool, comprising: a tubular body having an inner surface and an outer surface, the tubular body defined by a long, hollow tube having a length along a rotational axis of the cutting tool greater than a thickness of the tubular body; a front support structure comprising a central hub and a plurality of spokes extending radially outward from the central hub; and at least one slot extending through the inner surface and the outer surface of the tubular body; and a front cartridge support extending radially outward from the tubular body and received in the at least one slot, wherein the front cartridge support is directly attached to the front support structure.

17. The cutting tool of claim 16, wherein the plurality of spokes of the front support structure comprises a first spoke type and a second spoke type, the first spoke type capable of transporting coolant from the central hub of the front support structure to the front cartridge support.

18. The cutting tool of claim 16, wherein the front cartridge support includes a pocket capable of receiving a cutting insert cartridge and a coolant hole in fluid communication with a rear machine connection member for providing coolant to a cutting insert/workpiece interface.

19. A composite cutting tool, comprising:
a tubular body;
a front support structure comprising a central hub and a plurality of spokes extending radially outward from the central hub; and
at least one slot extending through the inner surface and the outer surface of the tubular body; and
a front cartridge support received in the at least one slot and directly attached to the front support structure;
a support ring structure mounted on an outer surface of the tubular body, the support ring structure including at least one recess capable of receiving a rear cartridge support;
a rear support structure attached to an inner surface of the tubular body, the rear support structure comprising a central hub and a plurality of spokes extending radially outward from the central hub; and
a rear machine connection member attached to the rear support structure.

* * * * *